Oct. 22, 1929.      G. B. HINTON      1,733,018
APPARATUS FOR MAKING A CELLULAR FABRIC
Filed Jan. 10, 1929    11 Sheets-Sheet 1

Fig. 1

Inventor
George B. Hinton
O'Neill & Bunn
ATTORNEYS

Oct. 22, 1929.   G. B. HINTON   1,733,018
APPARATUS FOR MAKING A CELLULAR FABRIC
Filed Jan. 10, 1929   11 Sheets-Sheet 2

Oct. 22, 1929.  G. B. HINTON  1,733,018
APPARATUS FOR MAKING A CELLULAR FABRIC
Filed Jan. 10, 1929  11 Sheets-Sheet 10

Inventor
George B Hinton
By O'Neill & Bunn
ATTORNEYS

Patented Oct. 22, 1929

1,733,018

UNITED STATES PATENT OFFICE

GEORGE B. HINTON, OF MEXICO, MEXICO

APPARATUS FOR MAKING A CELLULAR FABRIC

Application filed January 10, 1929. Serial No. 331,577.

The invention relates to mechanism for the manufacture of a cementitious material of cellular structure of the general character described in my prior Patent No. 1,657,716 of January 31, 1928, the fabric comprising a body of adherent bubbles each having a rigid envelope of set hydraulic cement, the cells or bubbles being either of substantially uniform size, or of varying sizes with the larger sized bubbles or cells surrounded by bubbles or cells of smaller size or sizes. To this end, the invention contemplates the provision of apparatus for producing the preliminary mixture of relatively thin hydraulic cement grout and a flotation reagent and means for effecting the agitation and aeration of the mixture to produce the spumous mass consisting of bubbles encased in shells of the cement, which spumous mass or foam is susceptible of being cast into various forms, such as slabs and blocks, which, when cured by the setting up of the cement, are constituted solely of mutually adherent shells of set hydraulic cement.

The invention is illustrated in the accompanying drawings, in which:—

Fig. 3 is a sectional elevation of a mixing bucket.

Fig. 3ª is a detail of the operating means for the control valve.

Fig. 13 is a sectional elevation of the frother or machine for producing the ultimate spumous product.

While in my prior patent aforesaid, I have indicated that a mechanically operated flotation machine for separating minerals from their ores may be used for producing my new product, and, in certain of my pending applications Serial Nos. 228,477, 228,478 and 241,392, I have disclosed certain simple forms of machines for producing a froth of cement coated bubbles, it has been found, in carrying out the method on a commercial scale, that considerations of efficiency and economy, particularly where the product is to be manufactured continuously, certain improvements in the mechanism employed are necessary. The present invention, therefore, contemplates the provision of a complete plant for the manufacture of the product in its various forms, and in so far as the invention involves subject-matter common to said prior applications, the present case is to be regarded as a continuation in part thereof.

Figure 1:
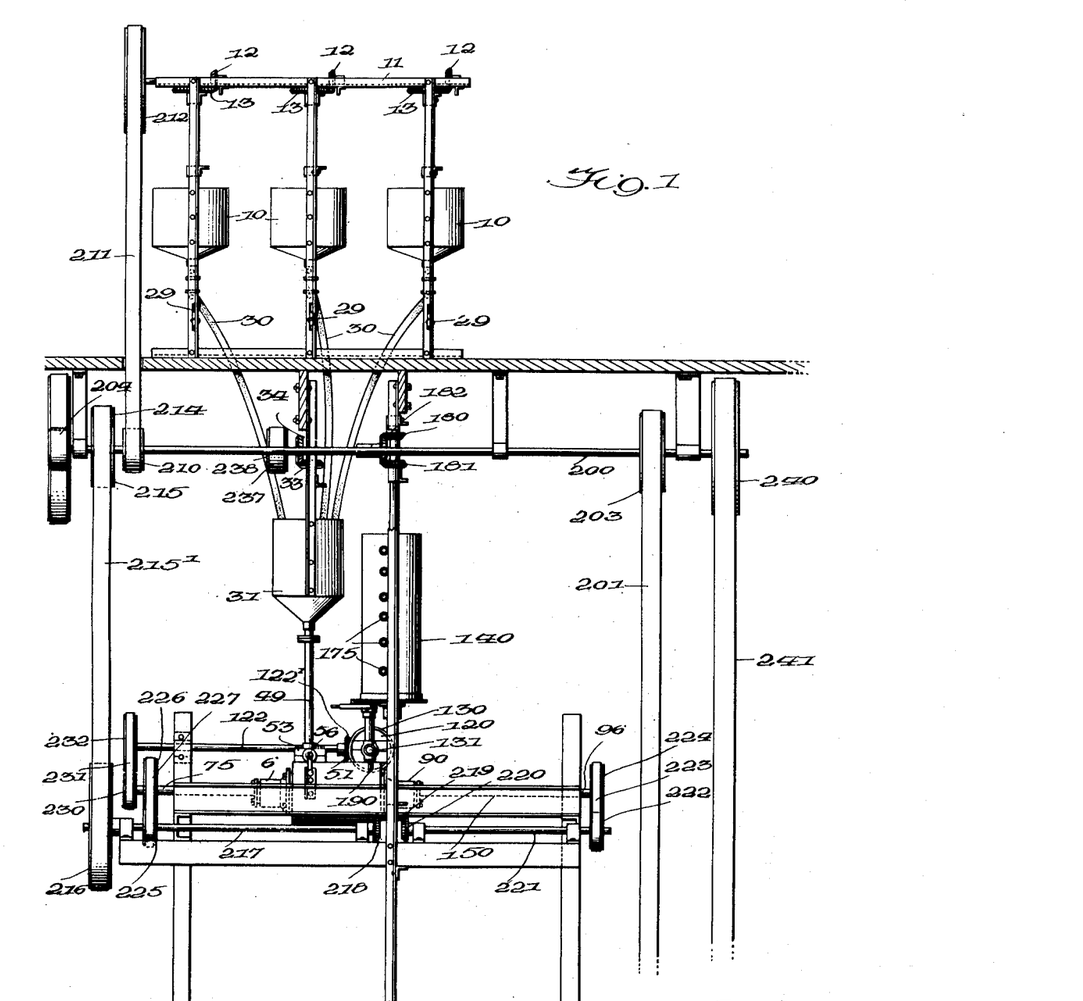
Fig. 1 is a front elevation of a plant by means of which the method of forming the cellular fabric may be carried out in its various aspects.
Figures 2, 21:
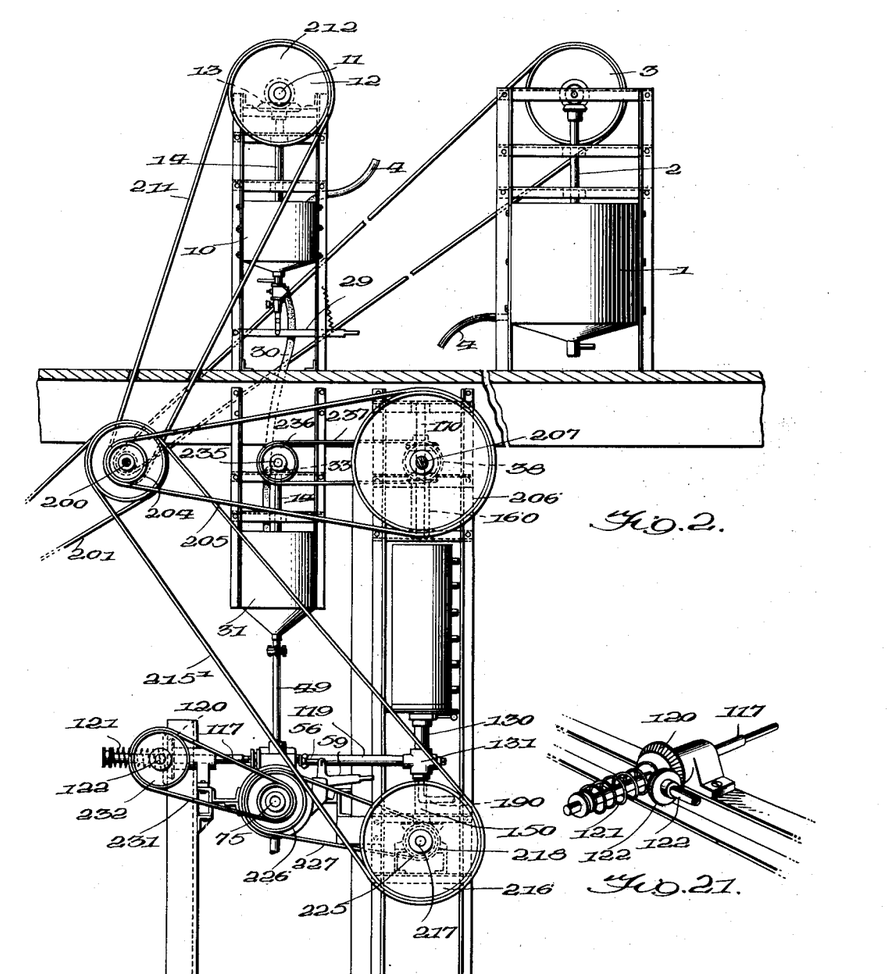
Fig. 2 is a side elevation.
Fig. 21 is a detail view of one of the driving connections for the means for preventing clogging of the pipes or connecting conduits.

Referring more particularly to Figs. 1 and 2 of the drawings, 1 indicates a tank or receptacle for receiving the cement, the necessary complement of water to constitute the grout and the relatively small proportion of the flotation agent upon which the formation of the froth or spumous mass of cement coated bubbles is dependent. This tank is preferably located at a point above the other elements of the plant and is provided with a suitable mixing or agitating device operated by shaft 2, which is driven from a pulley 3 geared to said shaft. The bottom of the tank is provided with a hose or similar conduit 4 by means of which the mixture of cement grout and the flotation oil is delivered successively to three mixing buckets 10, arranged in series at a lower level than the tank 1, so that, while one of said buckets is receiving its charge, the other may be mixing its charge and the third may be discharging the mixture into a common supply hopper.

Figures 3, 3A:
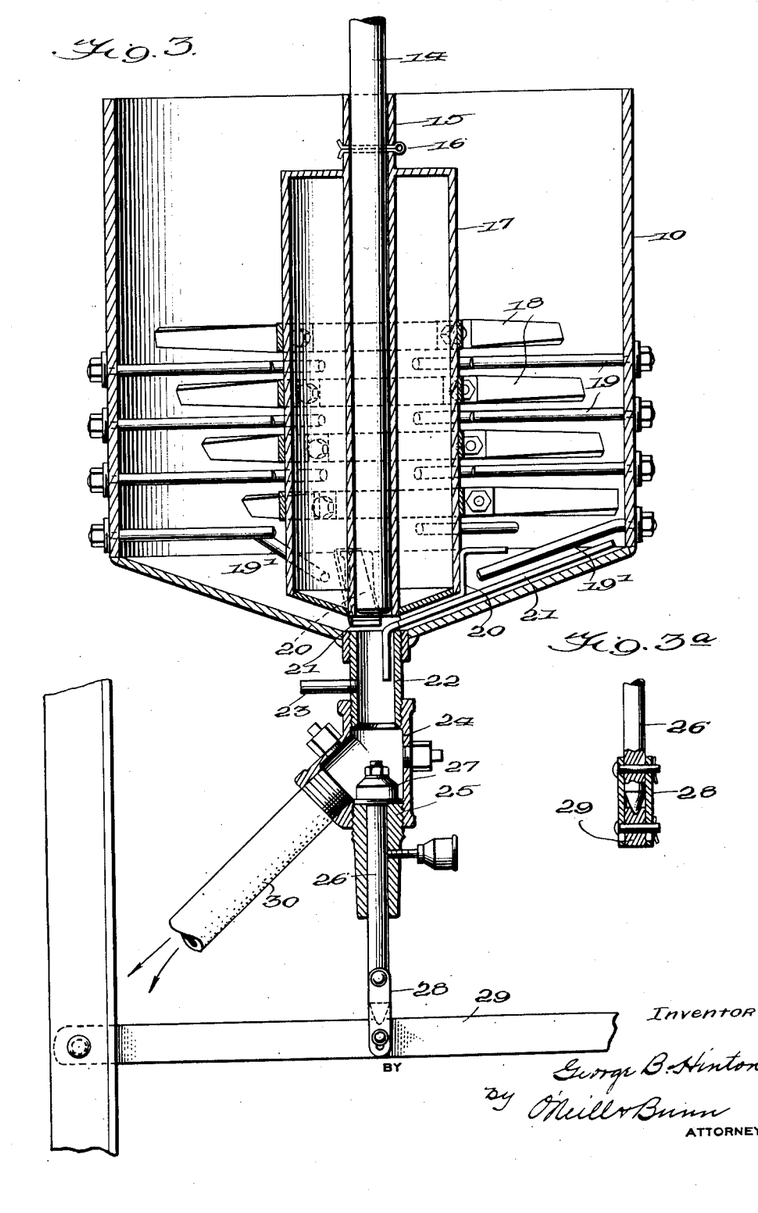
Figure 4:
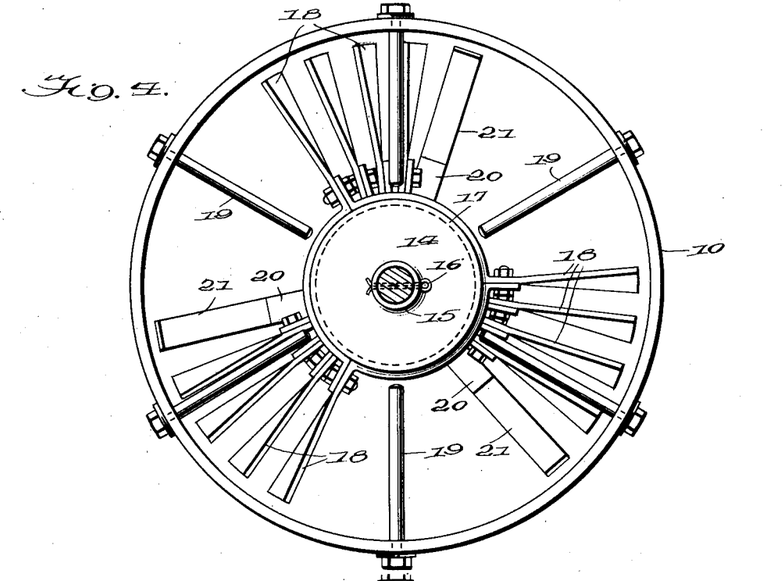
Fig. 4 is a plan view of the mixing bucket.
Figure 5:
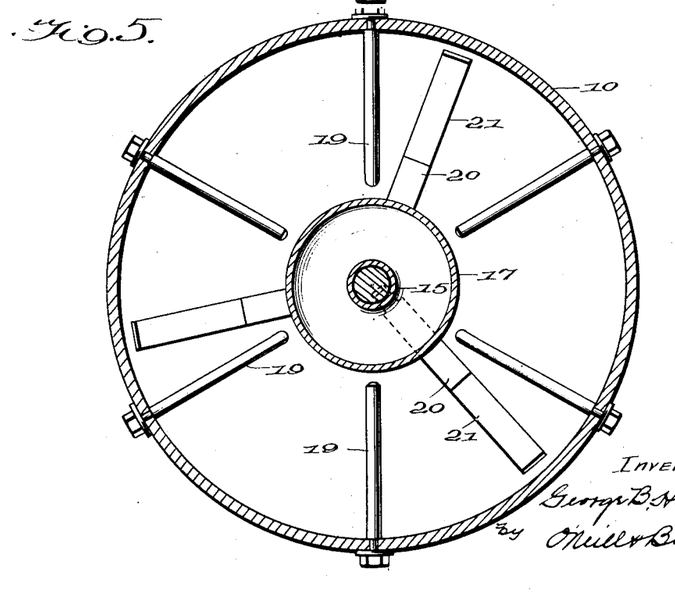
Fig. 5 is a horizontal cross section of the same.

It is essential that the admixture of the grout and the flotation medium be thoroughly homogeneous and, to this end, a special form of mixing bucket is provided and is illustrated in detail in Figs. 3 to 5, inclusive. The shell of the bucket 10 is substantially cylindrical with a conical bottom having a central discharge. Suspended axially of the bucket is a drive shaft 14 and fixed to the lower end of the shaft by means of a cotter pin 16 is a sleeve 15, which carries a cylindrical shell or core 17 having a tapered bottom conforming generally to the bottom of the bucket and elevated a slight distance above the latter, the purpose of this core being to prevent the formation of an axial vortex, which would tend to separate the elements of the mixture when the latter is agitated by the rotary stirrers. Fixed to the surface of the core 17 at spaced intervals are radial blades 18, which are twisted or feathered in the direction of their length to produce a thorough agitation of the mixture. Secured to the side walls of the bucket and projecting radially toward the axis of the same between the vertically disposed series of blades or paddles 18 are pins 19 which perform the following functions: First, they prevent the pulp from rotating too fast under the influence of the blades or paddles; second, they prevent the clogging of the cement between the paddles; and third, they break up any lumps which may tend to form in the mixture. Preferably the clearance between the paddles and the interposed pins or rods is restricted to approximately one-quarter inch, which insures the carrying out of the functions aforesaid. As indicated in Fig. 3, some of the rods or pins, as 19', adjacent the bottom of the bucket are inclined into substantial parallelism with the bottom to prevent the tendency of the cement to accumulate or settle on those portions of the bottom where the stirring action is least effective. Secured to the bottom of the core is a series of angular blade-like members 20, which project between the inclined pins 19' and the radial pins 19 and fastened to the members 20 are scraper bars 21 which sweep over the inclined bottom of the bucket and pick up any heavy particles which would tend to lodge on the bottom, so that these heavy particles are moved upward by the spiral formation and arrangement of the paddles 18 and incorporated in the mixture, so that the latter is reduced to a homogeneous pulp. One end of one of the scrapers 21 is bent downward into the discharge nipple 22 connected to the opening in the bottom of the bucket and serves to prevent the cement from sticking to the walls of the nipple and building up thereon.

The purpose of securing the core 17 and the attached paddle to the shaft by the cotter pin 16 is to provide a safety device to avoid wrecking the machine, should some foreign body find its way into the apparatus, under which conditions the cotter pin would shear and the rotation of the core and paddles would be suspended. An air supply pipe 23 is connected with the discharge nipple 22 of the bucket to facilitate the cleaning of the machine and for blowing out any cement which might tend to accumulate in the nipple and the parts connected therewith. It will be understood, however, that this air supply is used only in the contingencies indicated.

Secured to the bottom of the nipple 22 is a standard Y connection 24 to the bottom opening of which is secured a plug 25 which has a longitudinal opening therein to serve as a guide for the stem 26 of a valve 27, which has a tapered face adapted to engage the beveled lower edge of the nipple 22 and a flanged rear face which seals the opening in the guide plug 25, when the valve is fully opened. Preferably, the valve plug is made of rubber to insure a complete sealing of the discharge nipple 22, when the valve is closed, and to prevent access of the pulp to the rear of the valve, when the latter is opened. This valve is operated by lever 29 connected by links 28 to the lower end of the valve stem 26 the valve being normally closed by a spring (not shown) secured to the outer end of the lever 29.

Secured in the other opening of the Y 24 is the nipple of a flexible hose connection 30, which latter serves to deliver the mixture, which has been homogenized in the bucket, to a supply hopper, which is adapted to receive the contents of the several mixing buckets 10 in succession, so that the operation of the apparatus may be substantially continuous.

Figure 6:
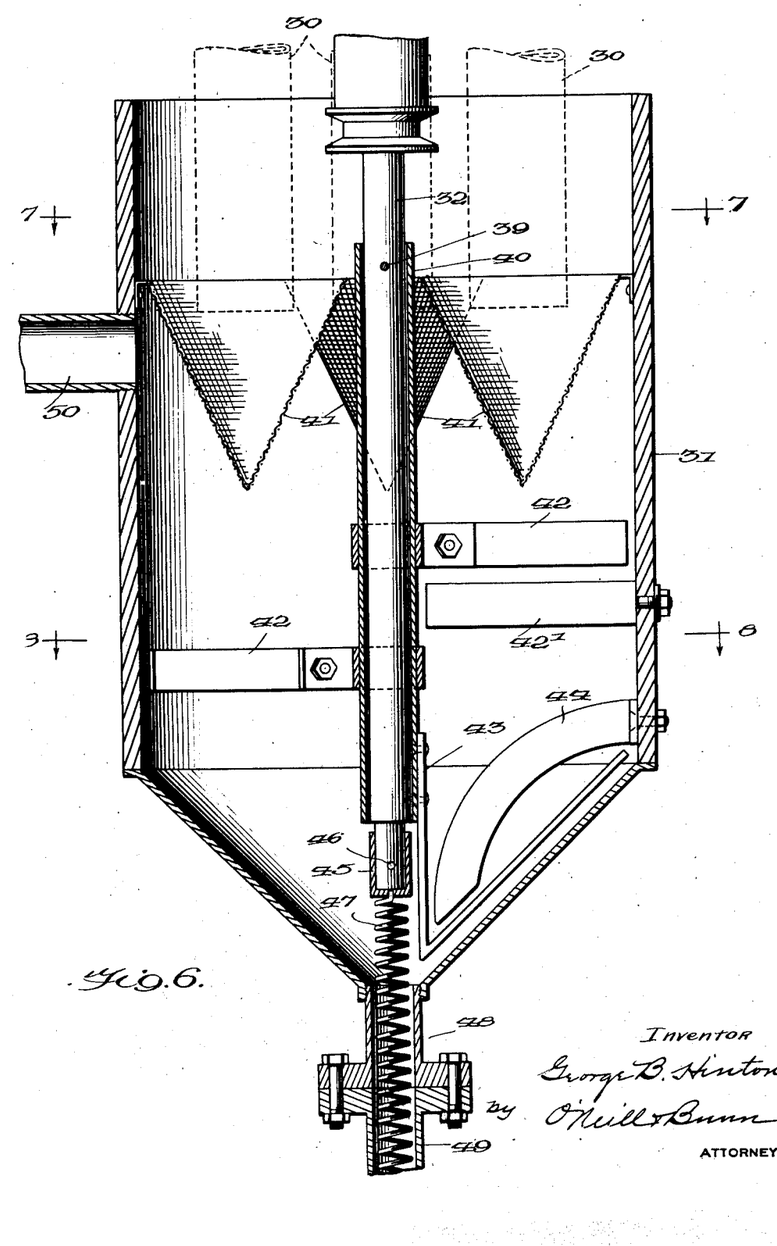
Fig. 6 is a sectional elevation of the hopper.
Figures 7, 8, 9:
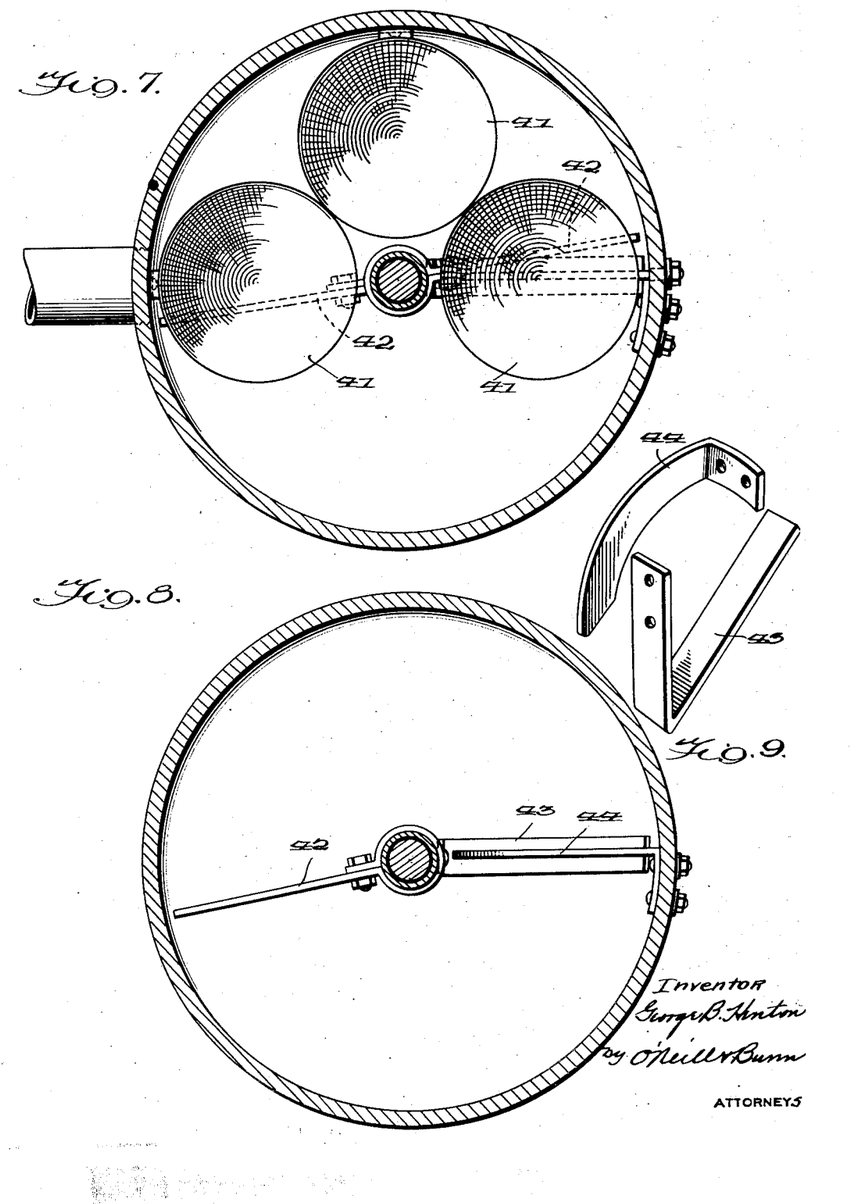
Fig. 7 is a section on line 7—7 of Fig. 6.
Fig. 8 is a similar section on line 8—8 of Fig. 6.
Fig. 9 is a perspective detail view of the scraper blades employed in the hopper.

Each of the mixing buckets 10 discharges into a hopper 31, the ends of the respective hoses from the mixing buckets delivering the mixture into three conical screens 41 suitably secured to the side walls of the hopper, the purpose of the screens being to retain any foreign solid material or lumps of cement. Extending axially of the hopper is a shaft 32, to which is secured a sleeve 40 by means of a cotter pin 39, this connection constituting a safety device of the same general character as described in connection with the mixing buckets. Fastened to the sleeve 40 are radial blades 42 and projecting from the side wall of the hopper is one or more stationary blades 42', the purpose of these blades or paddles being to prevent the cement pulp mixture coming to rest and, therefore, obviating the tendency of the cement to settle out of the mixture and build up on the walls of the apparatus.

Secured to the bottom of the sleeve is a scraper 43, which removes any cement which tends to settle on the inclined bottom of the hopper and fastened to the wall of the hopper is a curved blade 44, the function of which is to prevent the formation of a revolving lump of cement adjacent the discharge of the hopper. Secured to the end of the shaft 34 by pin 46 is a sleeve 45, which carries a helical member 47, which extends through the opening in the bottom of the hopper and into the conduit members 48 and 49, which connect the hopper with other elements of the system. The hopper is provided with an overflow pipe 50 at a point below the top, in order to prevent spilling the pulp mixture in case of stoppage of the flow from the hopper.

As illustrated in Figs. 1 and 2, the hopper is normally connected with the inlet of a preliminary aerating apparatus, which is effective to transform the mixture of cement grout and flotation medium into a spumous mass of very fine bubbles, the mass being of a creamy consistency, from which fact the device is referred to as the creamer to distinguish the same from the other elements of the system. The creamer is designed to receive the cement pulp from the hopper and agitate and aerate the same under conditions that will produce the formation of minute air bubbles encased in their thin shells of cement and to deliver the spumous mass to the frother, to be hereinafter described.

Figure 10:
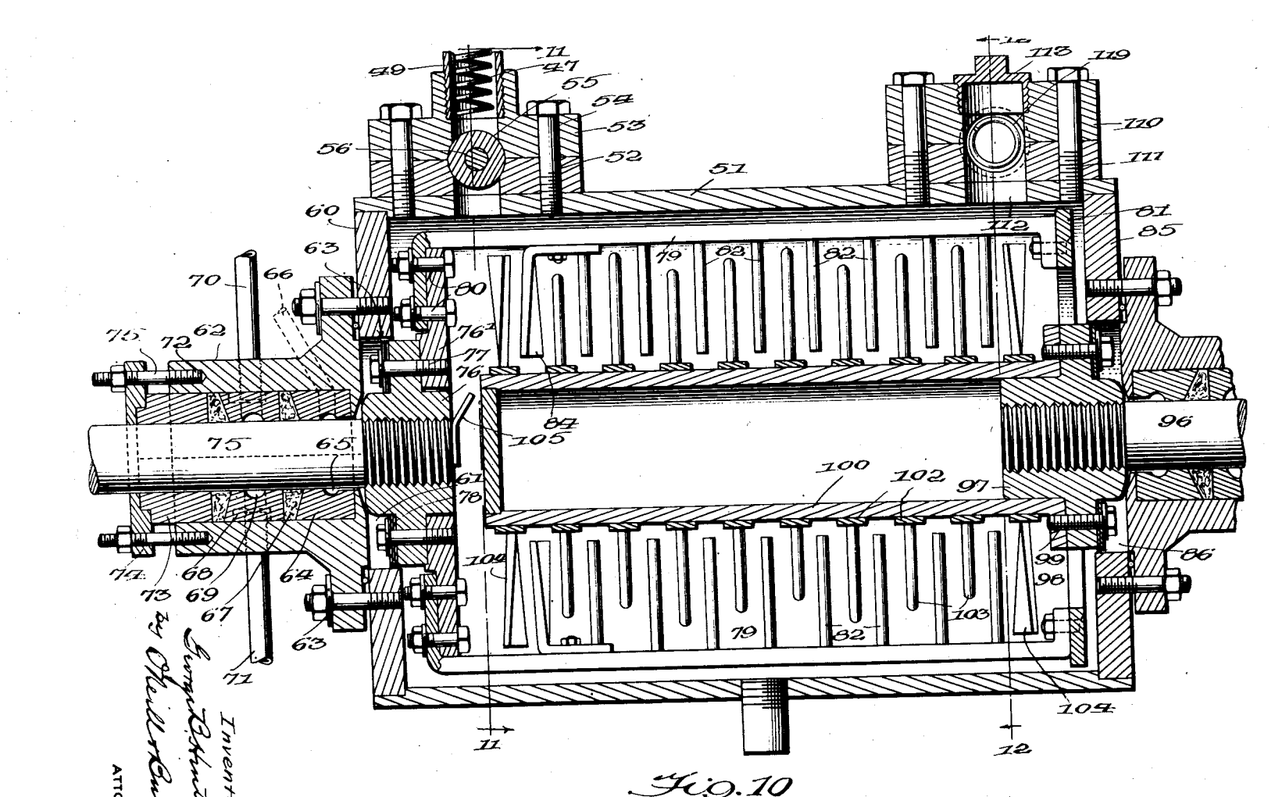
Fig. 10 is a sectional elevation of the so-called creamer or preliminary aerator.

The creamer comprises a cylindrical shell 51 having end closures 60 and 85, respectively, which latter are provided with central openings. Near one end, the cylindrical shell 51 is provided with an inlet opening 52 with which registers the opening in a valve block 53 bolted to the shell. The valve block or casing is provided with a transverse opening, to one end of which is secured the end of pipe 49 leading from the hopper and the other end of which registers with the inlet 52. The casing 53 also has a longitudinal cylindrical bore in which operates a valve, the body 55 of which is a rubber cylinder mounted upon a stem 56, which also carries a sleeve 57 adapted to be adjusted on the stem to compress the valve body 55 longitudinally and, therefore, expand the same radially into fluid-tight engagement with the bore of the valve casing, this adjustment of the sleeve being effected by the winged nut 58 engaging threads on the stem 57. The valve is operated by means of a rock lever 59, which is pivoted to the bracket 60 secured to the shell 51 of the creamer.

The end of the creamer adjacent the inlet 52 is, as hereinbefore stated, provided with a closure 60 having a central opening 61, which is closed by a special form of stuffing box 62, which is secured in place by bolts 63. The stuffing box, which also constitutes a journal bearing, includes an inner bushing 64, provided with an annular channel 65, which is connected to an air supply pipe 66 tapped into the body of the stuffing box, as indicated in Fig. 10, so that air may be delivered into the creamer between the bushing and the shaft 75, which rotates therein. The packing units 67 are preferably of loose cotton or similar fibrous material and interposed between bushing 64, central bushing 68 and an end bushing 73. The central bushing 68 is provided with an annular channel on its inner face, which channel is connected by registering radial openings in the bushing and the body of the stuffing box to a water supply pipe 70 and a water exhaust pipe 71, by means of which a circulation of water in the bushing and about the shaft may be effected. The end bushing 73 is connected to the body member 62 by means of a follower plate 74 and adjusting screws or bolts 75, so that the necessary pressure may be applied to the packing units by setting up the nuts on the outer ends of the bolts 75. The purpose of the water circulation in the groove 69 is to keep the bearing of the shaft in the stuffing box cool and to wash out any solid material that may work along the shaft.

The shaft 75, which passes through the stuffing box, has attached to its inner end a hub section 76 which is spaced a short distance from the inner face of the stuffing box to provide an annular passage for the air delivered to the machine by the pipe 6 and the annular groove 65 in the bushing 64. The medium flange of the hub is of less diameter than the opening 61 in the end of the shell and is faced on the side adjacent the stuffing box with a rubber gasket 78, which is of less diameter than the opening 61 to provide a narrow annular passage for the entering air, the pressure of air in the two narrow annular passages between the hub and the stuffing box and between the gasket 78 and the inner periphery of the opening 61 provides a double seal to prevent the escape of any of the mixture in the creamer past the stuffing box.

Figures 11, 12:
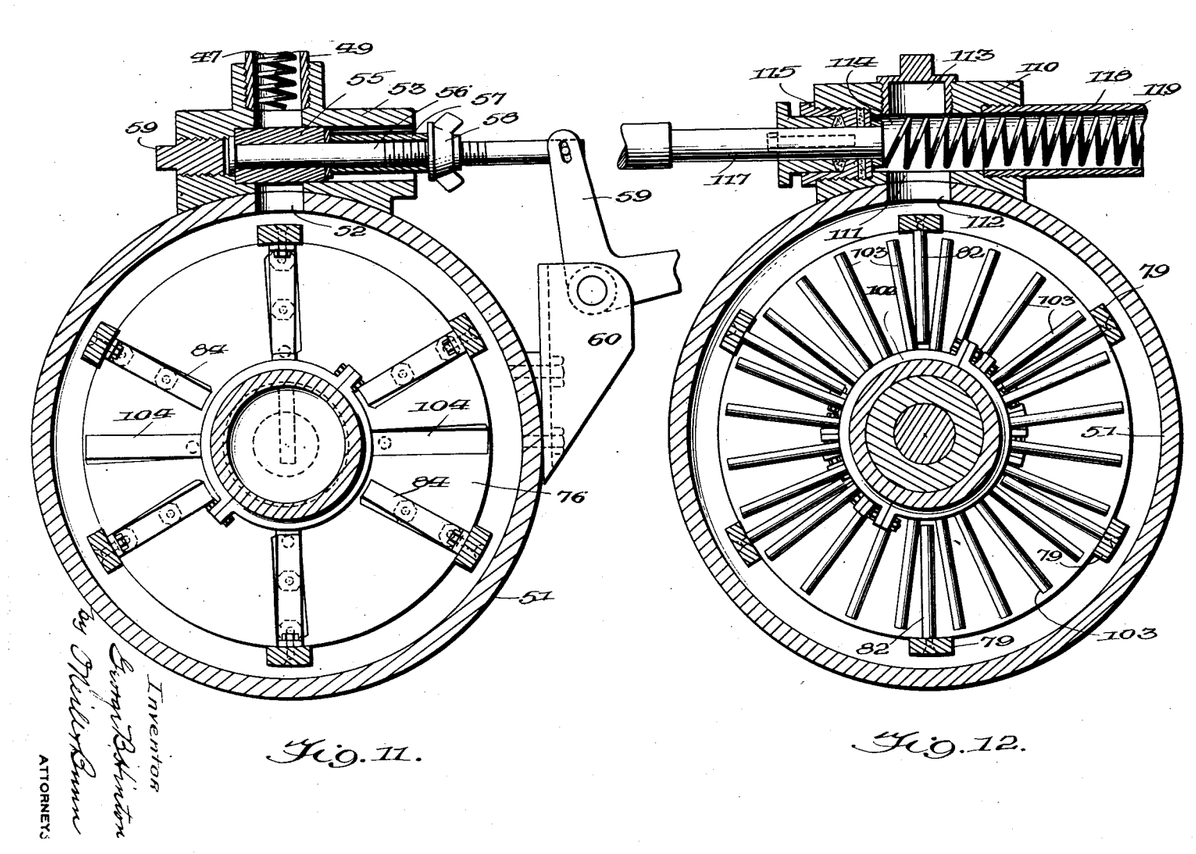
Fig. 11 is a section on line 11—11 of Fig. 10.
Fig. 12 is a section on line 12—12 of Fig. 10.

Secured to the hub 76 by bolts 77, which also secure the gasket 78 in place, is a disk 76' to which are fastened spaced longitudinal bars 79 by bolts 80, the opposite ends of the bars being attached to a ring 81, the disk, the bars and the ring constituting a rotating squirrel cage. Secured in spaced relation to each of the bars 79 is a series of fingers or beaters 82 and to each of the bars adjacent the inlet of the creamer, there is mounted a feathered blade or paddle 84, which series of blades force the mixture through the creamer toward the outlet end thereof.

Secured to the opposite end of the creamer shell is a stuffing box having the same characteristic structure and functions as that mounted at the inlet end of the creamer and all of the air supplied to the mixture in the creamer is delivered through these stuffing boxes. Passing through this latter stuffing box is a shaft 96 upon which is mounted a hub 97, similar to hub 76, which is faced with a washer 98 providing an annular groove for the admission of a thin stream of air in the same manner as the gasket 78.

Secured to the hub 97, by the same bolts 99 which fasten the gasket 98 thereto, is a closed cylindrical core 100 which provides an annular mixing space between its outer surface and the inner wall of the creamer shell and also prevents the setting up of a vortex in the mixture, while the same is being agitated. Secured to the peripheral surface of the core 100 is a spaced series of split collars 102 upon which are mounted an annular series of beater paddles or arms 103 similar to the arms 82 carried by the squirrel cage bars 79. In order to compensate for the greater beating action of the arms or blades on the squirrel cage and the bar 79 thereof, a larger number of arms or blades is included in each peripheral series on the core than on the squirrel cage and, in the exemplary form of the machine shown, for every six arms or blades on the squirrel cage eight are provided on the core and, as these arms are alternated on the core and squirrel cage respectively, it will be seen that the centrifugal force set up by one set of rotating members will be exactly balanced or counteracted by the other oppositely rotating set. Fastened to the opposite ends of the core 100 is a peripheral series of feathered paddles 104, each set being oppositely inclined and each tending to direct the flow of the mixture in the creamer toward the outlet thereof. In other words, the thrust of the paddles is away from the stuffing boxes and this thrust protects the stuffing boxes against the entrance of the mixture in the creamer and at the same time forces the air entering through the stuffing boxes into the body of the pulp mixture.

The collars on the core are staggered, as shown in Fig. 12, in order to prevent the arms or blades on the collar and those on the squirrel cage coming into alignment simultaneously, thereby insuring the smooth uniform beating action without jerks or varying impulses.

At the end of the shell opposite the inlet 80, there is provided an outlet opening 112 with which registers a split housing 110 secured to the journal by suitable bolts, said housing having a vertical opening 111, which is closed at its top by a plug 113. The housing is provided with a longitudinal bore 114, in one end of which is fitted a stuffing box 115 in which is mounted the end of a shaft 117, to the end of which is fastened a helical stirrer or clearer 119, which latter extends throughout the length of the pipe 118, which connects the discharge end of the creamer with the inlet of the frother. This stirrer or clearer is similar in construction and operation to that mounted in the conduit connecting the hopper with the creamer and serves to prevent the pipes being clogged or obstructed by the accumulation of cement on the inner walls thereof.

The frother, illustrated in Figs. 13 to 20, inclusive, comprises a cylindrical shell 140, which is preferably mounted vertically, said shell having a bottom closure 141 with a central opening, closed by a stuffing box 151 of the same type as employed in the creamer and which serves to supply most of the air to the frother.

Figure 20:
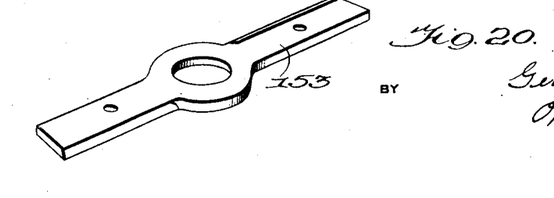
Fig. 20 is a perspective view of the cutter blade or knife.

Passing through the stuffing box 151 is a vertical shaft 150, upon the inner end of which is secured a hub 152, which carries the cutter or rotor which serves to divide the entering air into bubbles. This cutter comprises a knife member 153 with beveled edges upon which is mounted a foraminous disk 154, which may be formed either of wire mesh fabric or a foraminated plate, the knife and the disk being secured to the hub by bolts 157 and washers 155 and 156 and the latter washer being of less diameter than the central opening in the bottom of the frother, to provide a narrow annular space through which the air delivered through the stuffing box enters the frother in a relatively thin stream, which is immediately broken up into bubbles, the size of which will be regulated and determined by the speed of revolution of the cutter. The beveled edges of the knife 153 clears any cement which tends to settle at the bottom of the frother and forces the same up into the mixture being treated.

Suspended axially in the upper open end of the frother shell is a hollow shaft 160, to which is fastened, by one or more set screws 162, a hub 161 to which is secured a series of bars 164, the lower ends of which bars, near the bottom of the frother, are fastened to a ring 167, this structure constituting a rotating cage generally similar to the cage used in the creamer. Connected to the bars 164 at spaced intervals are mixing or agitating elements preferably in the form of foraminated plates or screens 165, which alternate with similar screens carried by the oppositely rotating core, to be hereinafter described. Also mounted on the bars 165 are one or more series of propeller blades or paddles 166, which tend to force the material in the frother upwardly.

Concentric with the hollow shaft is a shaft 170, near the end of which is secured a spindle 171 carrying a core 172, which, like the core in the creamer, is designed to provide an annular mixing space between the inner wall of the shell and the peripheral surface of the core and also to prevent the formation of a central whorl or vortex in the material being treated. Secured to the periphery of the core at spaced intervals and alternating with the foraminated plates or disks carried by the cage is a series of similar foraminated plates or disks 173 and mounted on the core in cooperative relation with the paddles 166 carried by the cage are oppositely inclined paddles 174, which also serve to force the material being treated in an upward direction in the frother.

Figure 14:
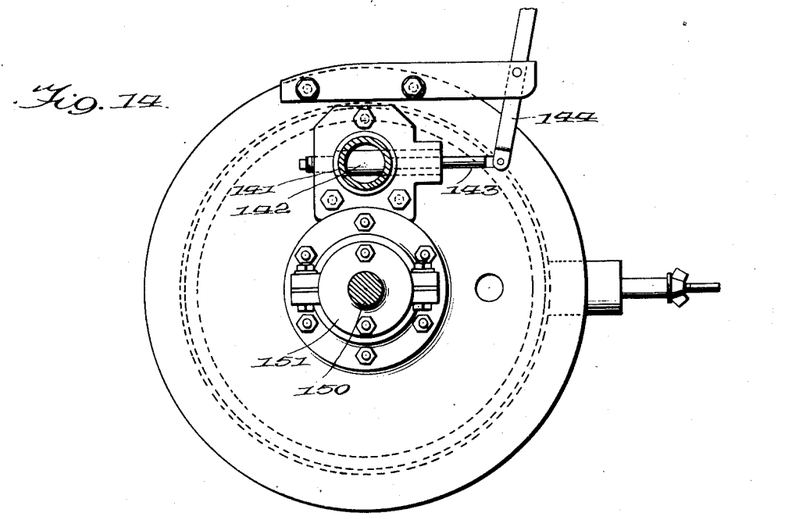
Fig. 14 is a bottom plan view of the frother.

Secured to the lower ring 167 of the cage is a foraminous disk or screen 169, which rotates in an opposite direction to the cutter carried by the shaft 150 and which cutter comprises the knife 153 and the foraminous disk or screen 154. In view of the fact that the cutter rotates at a relatively high speed, for example 150 R. P. M., and the oppositely rotating screen 169 carried by the cage is driven at a much lower speed, for example 60 R. P. M., it is evident that the cutter would produce relatively heavy centrifugal forces which would tend to separate the elements of the mixture entering the frother and, therefore, materially injure the resulting product. In order to neutralize the effect of the high speed of the cutter and to overcome the centrifugal force developed in the mixture, the screen 169 is secured to the cage by a relatively large number of bolts 168, which project toward the cutter and the resistance offered by these bolts, together with the centrifugal force developed by the foraminated plate 169, will practically counter-balance the centrifugal force of the high speed cutter. The provision of the oppositely rotating screens 154 forming part of the cutter and 169 attached to the cage, operating in close proximity to each other, make a very efficient mechanism for cutting up the thin air streams entering the frother into bubbles of controlled size, but which are materially larger than the bubbles formed in the creamer.

The frother is provided with a vertical series of spaced outlets 175, which are closed by expansion plugs 176, which are preferably of the same general construction as the plug valve controlling the inlet to the creamer. The provision of these discharge openings at various levels is to permit the final product to be drawn off when it has attained the desired consistency.

Figure 15:
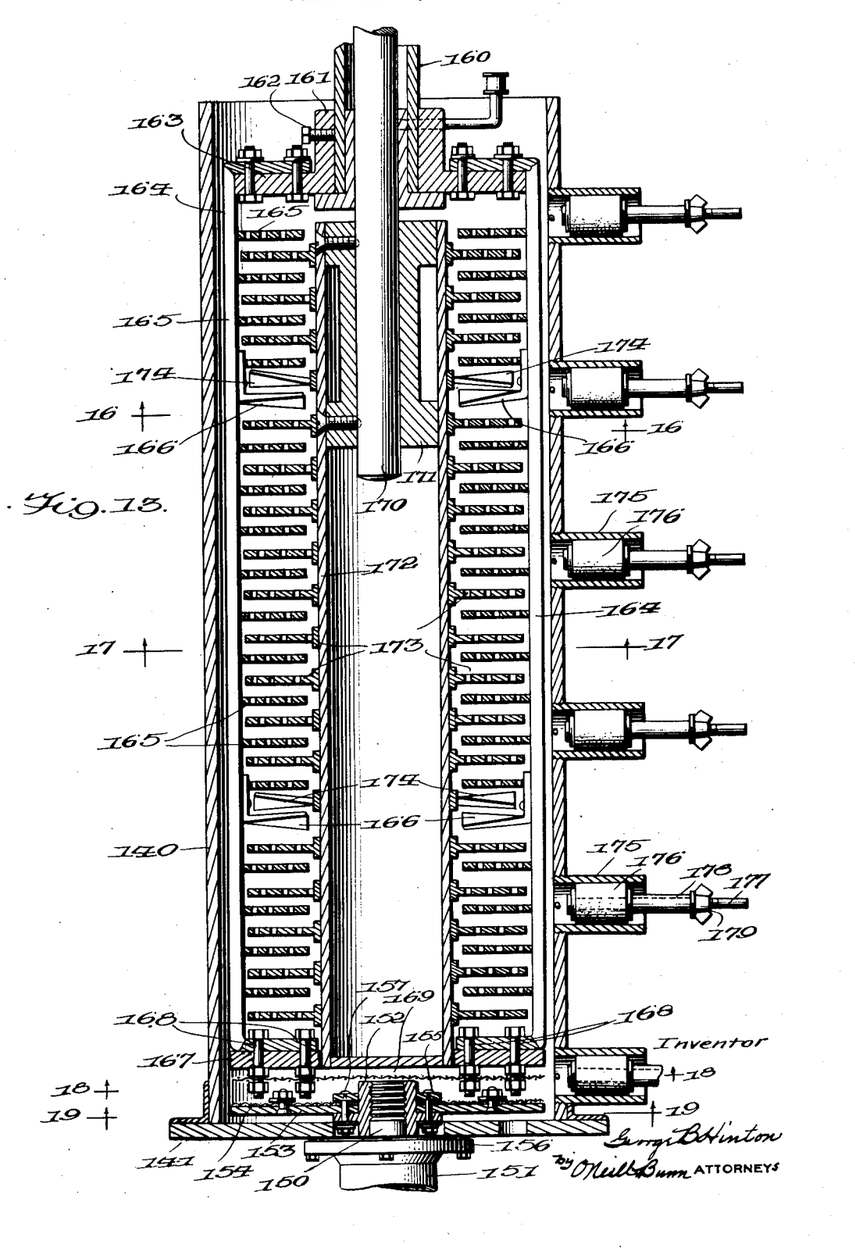
Fig. 15 is a fragmentary elevation of the frother with the inlet connections shown in section.
Figures 16, 17:
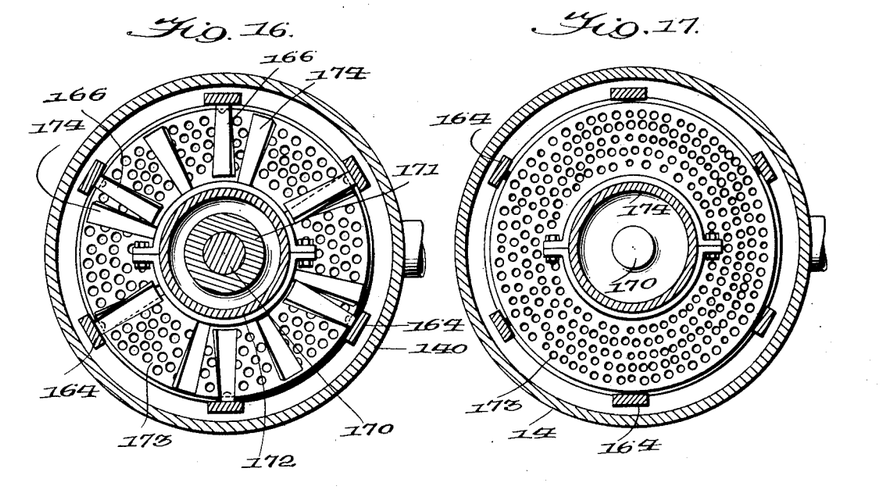
Fig. 16 is a section on line 16—16 of Fig. 13.
Fig. 17 is a section on line 17—17 of Fig. 13.
Figure 18:
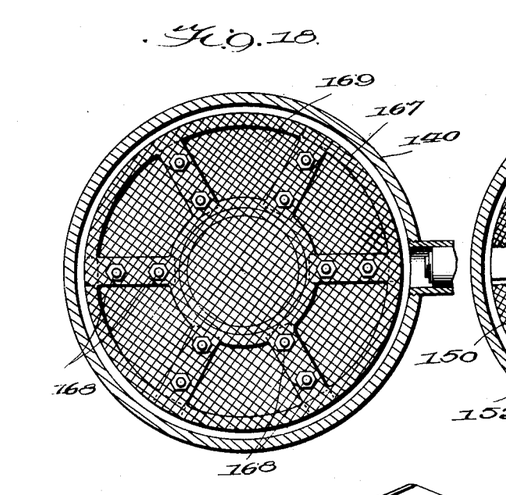
Fig. 18 is a section on line 18—18 of Fig. 13.
Figure 19:
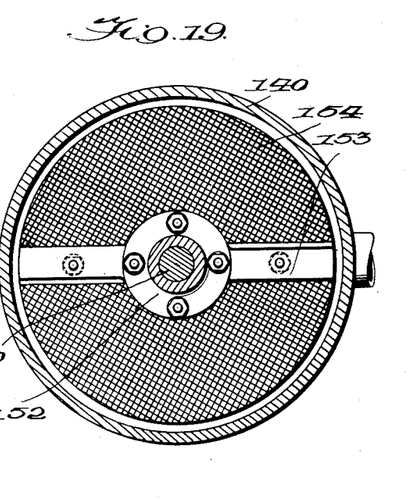
Fig. 19 is a section on line 19—19 of Fig. 13.

As shown, the frother is connected to the creamer by means of a pipe 118, which connects with a cross union 118', which, in turn, is connected with a nipple or short pipe section 130 with a valve casing 141, which is secured to the bottom of the frother with an opening therein in registry with an inlet opening at the bottom of the frother, the casing carrying a cylindrical slide valve 142 having a rod 143 which is operated by a lever 144 pivoted to a bracket or arm secured to the bottom of the frother. The other openings of the cross coupling are closed by plugs, one of which carries an auxiliary air pipe 190 by means of which air may be blown in through the inlet, by means of which the product from the creamer enters the frother, to assist the movement of the material, to prevent clogging of the passages and also, if desired, to supplement the supply of air to the frother.

Various moving parts of the system as disclosed are operated from a common power source and the driving means may be of any suitable character, a typical driving system being shown in Figs. 1 and 2, in which 200 represents the main power shaft, which is operated by a pulley 203 driven by a belt 201 from an electrical motor or other suitable power unit. The main shaft 200 may also carry a pulley 240 operating a belt 241 for driving the compressor, which supplies the air to the various elements of the apparatus. Mounted on the main shaft 200 is a pulley 210 operating a drive belt engaging pulley 212, which latter drives the shaft 11 carrying the beveled gears 12, which mesh with the corresponding beveled gears 13 on the upper ends of the shafts 14, which operate the stirrers in the respective mixing buckets. Also mounted on the shaft 200 is a pulley 215, which is connected by a belt 215' to the pulley 216 carried by countershaft 217. The latter has secured to one end a beveled gear 218, which meshes with a beveled gear 219 fast to the lower end of the shaft 150, which drives the cutter of the frother. In alignment with shaft 217 is a second shaft 221, which is driven by a beveled gear meshing with gear 219. On the outboard end of the shaft 221 is a pulley 222, which is connected by a belt 223 with a pulley 224 on the end of shaft 96, which drives the core and associated agitating arms or blades of the creamer. Carried by the shaft 217 is a pulley 225 connected by a belt 227 with a pulley 226, which latter is keyed to the shaft 75, which drives the cage and associated agitating or mixing arms or blades of the creamer, the rotation of the shaft 75 being opposite to that of shaft 96 and the speed of rotation of the respective shafts being substantially equal, so that the centrifugal effect of one set of mixing arms or blades will be counterbalanced by that of the other and any tendency of the elements of the cement pulp mixture to separate under the action of centrifugal force is obviated, while a thorough admixture of the pulp and the air admitted to the creamer is effected.

Mounted on the shaft 75 is a pulley 230, which is connected by a belt 231 to a pulley 232 on the end of a shaft 122, which latter is provided at its end with a beveled gear 122 meshing with beveled gear 120 fixed to shaft 117 to which the spiral clearer 119 operating in pipe 118 connecting the creamer with the frother. As shown in Fig. 21, the gear 120 is connected to the shaft 117 by means of a helical spring which would prevent breakage of the parts should the pipe 118 be clogged or obstructed. On the end of the main drive shaft 200 is fastened a pulley 204, which is connected by a belt 205 with a pulley 206 mounted on a jack shaft 207, which carries a beveled gear 182, which meshes with beveled gears 180 and 181 secured respectively to the shafts 170 and 160 which drive the cage and core of the frother in opposite directions and at the same speed. The shaft 207 also carries a pulley 238, which is connected by a belt 237 with a pulley 236 fast to a shaft 235, which, in turn, carries a beveled gear 34 meshing with the beveled gear 33 on the end of the shaft 30 of the hopper.

As hereinbefore indicated, the system, as illustrated and described, is designed to carry out the method as covered by my prior patent aforesaid under optimum conditions of efficiency and economy and to produce a cellular fabric of the character described in its various modifications, namely, either a fabric constituted solely of mutually adherent bubbles or cells of substantially uniform size having thin rigid envelopes of set hydraulic cement, or this fabric may consist of cement coated bubbles of relatively large size completely surrounded by similarly coated bubbles or relatively small size, so that the resultant fabric may be described as unicellular, bicellular or multicellular, depending upon whether bubbles of one size or of two or more different sizes are generated and ultimately incorporated and uniformly distributed in the spumous mass before the latter is cast into its ultimate shape, which will take the form of blocks, slabs or any other moldable configurations. Obviously, there is a relatively wide range or selection in the proportions of the water and cement, in the character or grade of the cement and in the flotation oils or reagents employed. For example, in my prior patent, the proportions of water to cement in making up the grout is indicated as from 30% to 60% by weight of water and it was stated grouts with over 60% of water produce cementitious materials of too light weight. It has been found that this is only true of the coarser cements. I have found that, by using the better grades of cements which are ground to substantially uniform and high degree of fineness, so that anywhere from 85% to 98% would pass through a 200 mesh screen, larger proportions of water varying from 60% to 90% by weight of the cement will give excellent results.

The selected proportions of cement and water, together with a relatively small proportion not to exceed .2% of the dry weight of the cement of a flotation reagent, various forms of which are described in my patent aforesaid, are preliminarily mixed in the curing tank 1, which serves as a reservoir for delivering standard charges or batches of the mixture to the three mixing buckets 10, so that, while one of the buckets is receiving a charge, the second is mixing the charge to homogenize the same, and the third is delivering its charge to the hopper 31, which is just large enough to receive a full charge from a single mixing bucket. In the hopper, the mixture is continuously stirred or agitated in order to maintain the same uniform and is delivered by the pipe 49 to the creamer, the spiral agitator or clearer 47 operating in the pipe to prevent clogging of the latter by the mixture. In the creamer, the uniform mixture of the cement pulp and flotation reagent is uniformly agitated by the blades carried by the core and the cage members respectively of the creamer and at the same time air entering the creamer by way of the stuffing box at the opposite ends thereof is beaten up into fine bubbles by the rotating blades and distributed throughout the mass of the cement pulp, so that each bubble takes on a thin shell or envelope of cement, due to the action of the flotation reagent, the entire batch of the pulp being ultimately reduced to a creamy condition due to the multiplicity of very fine bubbles distributed throughout the same. The size of these bubbles, which is always quite small, is variable within certain narrow limits, depending upon the speed of operation of the machine. As explained, the purpose of the oppositely rotating agitating blades is to neutralize the centrifugal forces which would be produced, if an agitator rotating in one direction only were employed. Due to the hydrostatic head of the relatively thin mixture of cement pulp and flotation reagent in the hopper 31, a continuous flow of the mixture through the creamer is maintained, which flow is assisted by the paddle blades mounted on the cage and core respectively of the creamer. The spumous mass resulting from the operation of the creamer passes out of the discharge opening 12 into the pipe 118, in which is operated the clearing helix 119, which prevents the clogging of the pipe, and enters the bottom of the frother where it meets an additional supply of air delivered by way of the stuffing box 151 and also, if found necessary, by way of the auxiliary air supply 190 connected to the coupling which connects the pipe 119 with the inlet and the frother. This air upon passing into the frother is broken up into relatively large bubbles by the knife 153 and the rotating foraminous disk or screen 154, the size of the bubbles being determined, within limits, by the speed of rotation of the cutter consisting of the rotary knife and foraminated disk.

Inasmuch as all of the mixture from the creamer and the air supply to the frother must pass through the perforations in the cutter element and as the latter revolves at a relatively high rate of speed as compared with the speed of rotation of the oppositely driven foraminated members within the frother, the deleterious centrifugal forces set up by the cutter are neutralized by the lowermost screen 169 and the projecting bolts which secure the same to the cage member of the apparatus, which latter revolves in a direction opposite to that of the cutter. The relatively large bubbles of air being taken into the creamy mixture in the frother are distributed evenly throughout the mass of mixture by means of the oppositely rotating foraminous plates or screens carried by the cage and core members respectively, so that these large bubbles are provided with a shell or coating of cement and are each individually surrounded and enclosed by smaller bubbles, constituting the cream, the ultimate product being a froth of cement coated bubbles of larger and smaller sizes, the larger sized bubbles surrounded by the smaller bubbles. When the froth has reached the desired consistency, depending upon the character of the materials employed and the speed of operation of the frother, it is discharged from the frother by removing one of the plug valves 176, the outflowing froth being collected by any suitable means or being delivered directly to the mold in which it is to be cast.

As indicated, the product produced by the operation of the entire plant, including the creamer and the frother, is a bicellular froth with the large bubbles developed in the frother encased by the smaller bubbles turned out by the creamer. Obviously, the apparatus can be employed to produce a unicellular fabric of froth in which the bubbles are of substantially uniform size. This may be accomplished by cutting the creamer out of the circuit and connecting the frother directly with the hopper. Furthermore, it will be apparent that, in making the bicellular product, both operations could be performed in one machine by, first, running the same at a high rate of speed to make the cream and then running it slowly to permit the formation of the large bubbles to be distributed throughout the pulp. Considerations of expediency and economy of operation, however, render it advisable to first treat the pulp in a relatively small creamer and then deliver the same into a larger frother, so that the difference in time required for the respective operations will be in accordance with the sizes of the machines.

What I claim is:

1. Apparatus for making a cellular fabric of cement coated bubbles, comprising means for preliminary mixing hydraulic cement grout and a flotation reagent, means for introducing air in the form of bubbles into the mixture, and means for agitating the aerated mixture.

2. Apparatus for making a cellular fabric of cement coated bubbles, comprising a receptacle for receiving the mixture, means for introducing air into the mixture, means for dividing the air into bubbles, and means in the receptacle for agitating the aerated mixture.

3. Apparatus for making a cellular fabric of cement coated bubbles, comprising a receptacle for receiving the mixture, means for introducing air into the mixture, means for dividing the air into bubbles, and means in the receptacle including oppositely rotating members for agitating the aerated mixture.

4. Apparatus for making a cellular fabric of cement coated bubbles, comprising a receptacle for receiving the mixture, means for introducing air into the mixture, means for dividing the air into bubbles, and means in the receptacle including oppositely rotating screens for agitating the aerated mixture.

5. Apparatus for making a cellular fabric of cement coated bubbles, comprising a tank, an inlet for continuously supplying the mixture to the tank, an inlet for supplying air to the mixture in the tank, and oppositely rotating horizontally disposed members in the tank for breaking up the air into bubbles to be coated with the cement mixture.

6. Apparatus for making a cellular fabric of cement coated bubbles, comprising a tank, an inlet for continuously supplying the mixture to the tank, an inlet for supplying air to the mixture in the tank, and oppositely rotating horizontally disposed foraminated members in the tank for breaking up the air into bubbles to be coated with the cement mixtures.

7. Apparatus for making a cellular fabric of cement coated bubbles, comprising a tank, an inlet for continuously supplying the mixture to the tank, and inlet for supplying air to the mixture in the tank, and oppositely rotating horizontally disposed foraminated plates in the tank for breaking up the air into bubbles to be coated with the cement mixture.

8. Apparatus for making a cellular fabric of cement coated bubbles, comprising a tank, an inlet for continuously supplying the mixture to the tank, an inlet for supplying air to the mixture in the tank, a rotary shaft in the tank, horizontally disposed foraminated plates carried by said shaft, a second oppositely driven rotating shaft in the tank and horizontally disposed foraminated plates carried by the second shaft and alternating with the plates on the first shaft.

9. Apparatus for making a cellular fabric of cement coated bubbles, comprising a tank, an inlet for continuously supplying the mixture to the tank, an inlet for supplying air to the mixture in the tank, a rotary shaft in the tank, horizontally disposed foraminated plates carried by said shaft, a second oppositely driven rotating shaft in the tank, a skeleton cage fixed to said shaft, and horizontally disposed foraminated plates fixed to the cage and alternating with the plates on the first shaft.

10. Apparatus for making a cellular fabric cement coated bubbles, comprising means for preliminarily mixing hydraulic cement grout and a flotation reagent, means for aerating and agitating the mixture to produce a spumous mass or cream of fine bubbles, a tank to receive said mass, means for supplying air to said tank, means for dividing the air into relatively large bubbles, and means for agitating the aerated mass to effect the coating of the larger bubbles with cement and to encase the same with the smaller bubbles.

11. Apparatus for making a cellular fabric of cement coated bubbles, comprising a cylindrical tank for receiving the mixture, a shaft carrying a cage, a second shaft carrying a core, alternating agitators carried by the cage and core respectively, means for driving the shafts in opposite directions, and an inlet for supplying air to the mixture in the tank.

12. Apparatus for making a cellular fabric of cement coated bubbles, comprising a cylindrical tank for receiving the mixture, a shaft carrying a cage, a second shaft carrying a core, alternating agitators carried by the cage and core respectively, means for driving the shafts in opposite directions, stuffing boxes for said shafts, and means for supplying air to the tank between the stuffing boxes and the shafts.

13. Apparatus for making a cellular fabric of cement coated bubbles, comprising a cylindrical tank, an inlet for supplying a mixture of hydraulic cement, a flotation reagent and air at the bottom of said tank, a rotating screen adjacent said inlet to divide the air into bubbles, coaxial oppositely rotating shafts disposed axially of the tank, a cylindrical core fixed to one shaft, a cage fixed to the other shaft, and horizontally disposed agitators fixed to the core and cage respectively and in alternating arrangement.

14. Apparatus for making a cellular fabric of cement coated bubbles, comprising a cylindrical tank, an inlet for supplying a mixture of hydraulic cement, a flotation reagent and air at the bottom of said tank, a rotating screen adjacent said inlet to divide the air into bubbles, coaxial oppositely rotating shafts disposed axially of the tank, a cylindrical core fixed to one shaft, a cage fixed to the other shaft, and horizontally disposed foraminous disks fixed to the core and cage respectively and in alternating arrangement.

15. Apparatus for making a cellular fabric of cement coated bubbles, comprising a cylindrical tank, an inlet for supplying a mixture of hydraulic cement, a flotation reagent and air at the bottom of said tank, a rotating screen adjacent said inlet to divide the air into bubbles, coaxial oppositely rotating shafts disposed axially of the tank, a cylindrical core fixed to one shaft, a cage fixed to the other shaft, horizontally disposed foraminous disks fixed to the core and cage respectively and in alternating arrangement, and propeller blades fixed at intervals to the core and cage to produce an upward current in the tank.

16. A plant for making a cellular fabric of cement coated bubbles, comprising a mixer for cement grout and a flotation reagent, a creamer including means for agitating and aerating the mixture to produce a spumous mass of fine cement coated bubbles, a frother receiving the mass from the creamer including means for forming larger air bubbles in the spumous mass, and means for agitating the aerated mass to effect the coating of the larger bubbles with cement and to encase the same with the smaller bubbles.

17. A plant for making a cellular fabric of cement coated bubbles, comprising a mixer for cement grout and a flotation reagent, a hopper into which the mixer discharges, a creamer receiving the mixture from the hopper, said creamer including means for agitating and aerating the mixture to produce a spumous mass of fine cement coated bubbles, a frother receiving the mass from the creamer including means for forming larger air bubbles in the spumous mass, and means for agitating the aerated mass to effect the coating of the larger bubbles with cement and to encase the same with the smaller bubbles.

18. A plant for making a cellular fabric of cement coated bubbles, comprising a mixer for cement grout and a flotation reagent, a hopper into which the mixer discharges, a creamer receiving the mixture from the hopper, said creamer including means for agitating and aerating the mixture to produce a spumous mass of fine cement coated bubbles, a frother receiving the mass from the creamer including means for forming larger air bubbles in the spumous mass, means for agitating the aerated mass to effect the coating of the larger bubbles with cement and to encase the same with the smaller bubbles, conduits connecting the hopper with the creamer and the creamer with the frother, and rotary agitators in said conduits.

19. A plant for making a cellular fabric of cement coated bubbles, comprising a mixer for cement grout and a flotation reagent, a hopper into which the mixer discharges, a creamer receiving the mixture from the hopper, said creamer including means for agitating and aerating the mixture to produce a spumous mass of fine cement coated bubbles, a frother receiving the mass from the creamer including means for forming larger air bubbles in the spumous mass, means for agitating the aerated mass to effect the coating of the larger bubbles with cement and to encase the same with the smaller bubbles, conduits connecting the hopper with the creamer and the creamer with the frother, and helical agitators in said conduits.

In testimony whereof I affix my signature.

GEORGE B. HINTON.